United States Patent [19]
Mensching

[11] Patent Number: 5,412,272
[45] Date of Patent: May 2, 1995

[54] SUBMERSIBLE EXPLOSION PROOF ELECTRIC BRAKE MOTOR

[76] Inventor: Herman E. Mensching, R.R. 3, Box 113M, Missouri Valley, Iowa 51555

[21] Appl. No.: 185,364

[22] Filed: Jan. 24, 1994

[51] Int. Cl.⁶ .............................................. H02K 5/12
[52] U.S. Cl. ........................................ 310/88; 310/71; 310/77; 310/87; 310/89; 310/112
[58] Field of Search ............. 310/88, 112, 87, 91, 310/71, 85, 89, 76, 77, 92, 93; 277/173; 92/171.1

[56]  References Cited
U.S. PATENT DOCUMENTS

| | | | |
|---|---|---|---|
| 3,311,325 | 3/1967 | Miller | 310/77 UX |
| 4,283,645 | 8/1981 | Hofmann | 310/71 |
| 4,661,734 | 4/1987 | Capuano et al. | 310/89 |
| 4,663,550 | 5/1987 | Kawada et al. | 310/93 |
| 4,811,820 | 3/1989 | Rossi | 310/76 |
| 5,291,088 | 3/1994 | Adam et al. | 310/88 |

Primary Examiner—R. Skudy
Attorney, Agent, or Firm—John A. Beehner

[57] ABSTRACT

The present invention includes an improvement to a conventional explosion-proof electric brake motor having a motor housing, an electrical conduit attached thereto, a brake housing secured to the motor housing and having an electrical attached to the brake housing, a flange secured to the motor housing and adapted to secure the motor to a drive mounting for driving a shaft. The improvement comprises a first housing waterproof means inserted between the motor housing and the brake housing. A first conduit waterproofing means is adapted to seal the brake electrical conduit to the brake housing. A second conduit waterproofing means is adapted to seal the motor electrical conduit to the motor housing. A flange waterproofing means is adapted to seal the flange to the motor housing. Thus, the conventional electric brake motor and the waterproofing means form a submersible, explosion-proof brake motor.

5 Claims, 4 Drawing Sheets

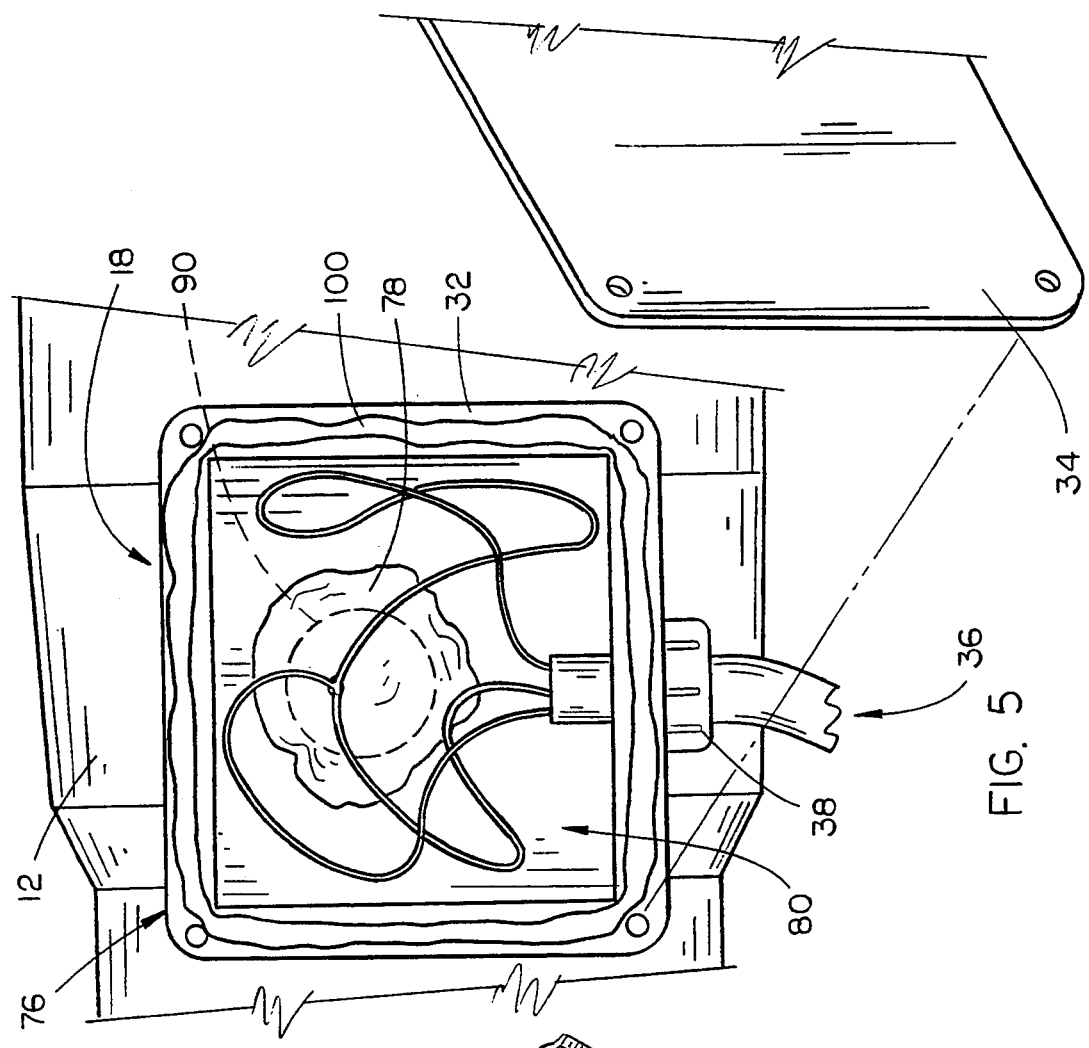
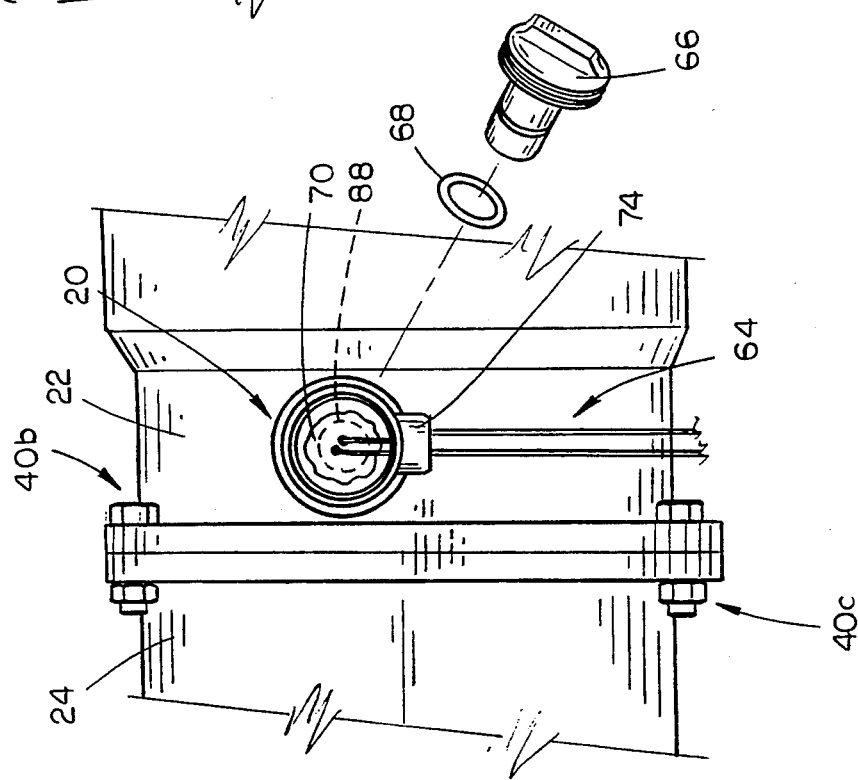
FIG. 5
FIG. 4

SUBMERSIBLE EXPLOSION PROOF ELECTRIC BRAKE MOTOR

BACKGROUND OF THE INVENTION

1. Technical Field

The method and apparatus of the present invention relate generally to an apparatus and method of constructing electric submersible brake motors. More specifically, it relates to a waterproof explosion-proof electric brake motor and an apparatus and method of modifying a commercial electric brake motor such that it may be operated in both a submersed environment and in an environment in which explosive gases are present. Explosive gas environments in which the brake motor may be operated typically comprise hydrogen sulfide or methane gases or the like.

In several operating situations, it is desirable to have a brake motor which can operate in both explosive and submersed environments. One such environment is in sewage treatment operations. In such operations, a bar rack screen is placed in the flow stream to catch debris. One such bar rack screen called the "Mensch Screen" is manufactured by Vulcan Industries of Missouri Valley, Iowa. A scrapper, driven by an electric brake motor, is employed which scrapes the screen clean of collected debris. In such environments, gases are frequently generated which have an explosive capacity, such as hydrogen sulfide, methane or the like. Additionally, depending on the depth of the flow stream, the scraper brake motor may become temporarily submersed. Consequently, it may be desirable to have a brake motor which may be operated in both explosive and submersed environments.

Currently, electric brake motors adapted to be operated in an submersible environment generally comprise conventional electric brake motors which have been encased in a water tight container. The enclosure case limits access to the brake motor when it is enclosed therein thereby requiring additional labor to effect any required service. The apparatus and method of the current invention relate to a waterproof, explosion-proof electric brake motor and modification of an existing explosion-proof brake motor, without enclosing the brake motor in a separate case. With the present waterproofing modification, the brake motor may be operated intermittently at water pressures up to 25 PSI.

2. Description of the Prior Art

Numerous electric brake motors are currently on the market. Such motors, in addition to the electric motor, comprise a brake which may be activated electrically. Several of these brake motors are also adapted to work in an explosive environment. One example of such a brake motor is the Baldor Brake motor, designated NEMA 56C through 215T-TC explosion-proof brake motors. As described above, many working environments call for brake motors which will safely operate in the presence of explosive gases. However, these so called "explosion-proof" brake motors are not adapted to be used in a submersible environment.

Some companies have developed modifications to commercially available explosion-proof brake motors to make them operable in a submersion environment. One example of such a modification, is the FMC Corporation. The FMC Corporations modifications entail housing the commercially available explosion-proof brake motor in a water tight container. However, such a method of rendering an existing brake motor submersible is limited by the physical dimensions of the water proof case. Obviously, only brake motors having a size which may fit within the case may be operated submersed by such a method. Additionally, it makes servicing of the brake motor more difficult since the brake motor must first be removed from the case before it may be worked on. Still further, a means must be developed which allows the drive shaft of the brake motor to be coupled to the external drive apparatus and thus the mounting to secure the brake motor must be adapted to accommodate the physical attributes of the enclosing water proofing case. Thus, there is a strong need for an explosion-proof, waterproof electric brake motor and a method and apparatus designed to be utilized with the conventional brake motors adapting them to be used in explosive and submersible environments, without requiring a separate enclosure case.

Therefore, a primary objective of the present invention is to provide a waterproof, explosion-proof electric brake motor apparatus.

Another primary object of the present invention is to provide an apparatus and method of water proofing a conventional explosive proof electric brake motor apparatus thereby allowing the brake motor to be used in a submersed environment.

Another object of the present invention is to provide an apparatus and method which may be quickly and efficiently implemented on existing, electric brake motors.

Another objective of the present invention is to provide a water proofing method and apparatus which may be utilized with a wide variety of commercially available electric brake motors.

A final objective is to provide method and apparatus whereby conventional explosion-proof electric brake motors may be waterproofed without the need for construction of elaborate, time consuming, or expensive enclosure cases.

SUMMARY OF THE INVENTION

The apparatus of the present invention includes an explosion-proof, waterproof electric brake motor and an improvement to a conventional explosion-proof electric brake motor. Such a brake motor may have a brake motor housing, an electrical conduit attached thereto, a brake housing secured to the brake motor housing and having an electrical attached to the brake housing, a flange secured to the brake motor housing and adapted to secure the brake motor to a drive mounting for driving a shaft. An example of such brake motors are the 56C-215T-TC series motors by Baldor. However, the inventive improvements disclosed herein are in no way limited to these particular brake motor models. The improvement comprises a first housing waterproof means inserted between the brake motor housing and the brake housing. A first conduit waterproofing means is adapted to seal the brake electrical conduit to the brake housing. A second conduit waterproofing means is adapted to seal the brake motor electrical conduit to the brake motor housing. A flange waterproofing means is adapted to seal the flange to the brake motor housing. Thus, the conventional electric brake motor and the waterproofing means form a submersible, explosion-proof brake motor.

The method of waterproofing a conventional explosion-proof electric brake motor includes the steps of removing the brake housing from the motor housing;

installing an O-ring seal between the brake housing and the motor housing; reinstalling the brake housing; installing waterproofing means in the brake housing electrical conduit; installing waterproofing means in the motor housing electrical conduit; removing the flange from the motor housing; installing an O-ring seal between the motor housing and the flange; and reinstalling the flange to the motor housing.

BRIEF DESCRIPTION OF THE DRAWINGS

FIG. 4 is an end view of the brake housing electrical conduit.

FIG. 5 is an end view of the brake motor housing electrical conduit.

DESCRIPTION OF THE PREFERRED EMBODIMENT

As described above, many working environments call for brake motors capable of operating in the presence of explosive gases. The standards for safe operation of electric brake motors in explosive environments, are dictated by the National Electric Code, Article 100-Definitions. Brake motors meeting these standards are referred to as "explosion-proof." Additionally, it may be desirable to have the brake motor capable of operating, for at east short periods, under water. The present invention comprises an explosion-proof, waterproof electric brake motor apparatus and a method and apparatus for modifying a conventional explosion-proof electric brake motor so that it may be operated at least temporarily in a submersible mode. Examples of such conventional electric brake motors are the 56C-215T-TC series models by Baldor. However, the invention disclosed herein is in no way limited to these electric brake motor models.

Figure 2:
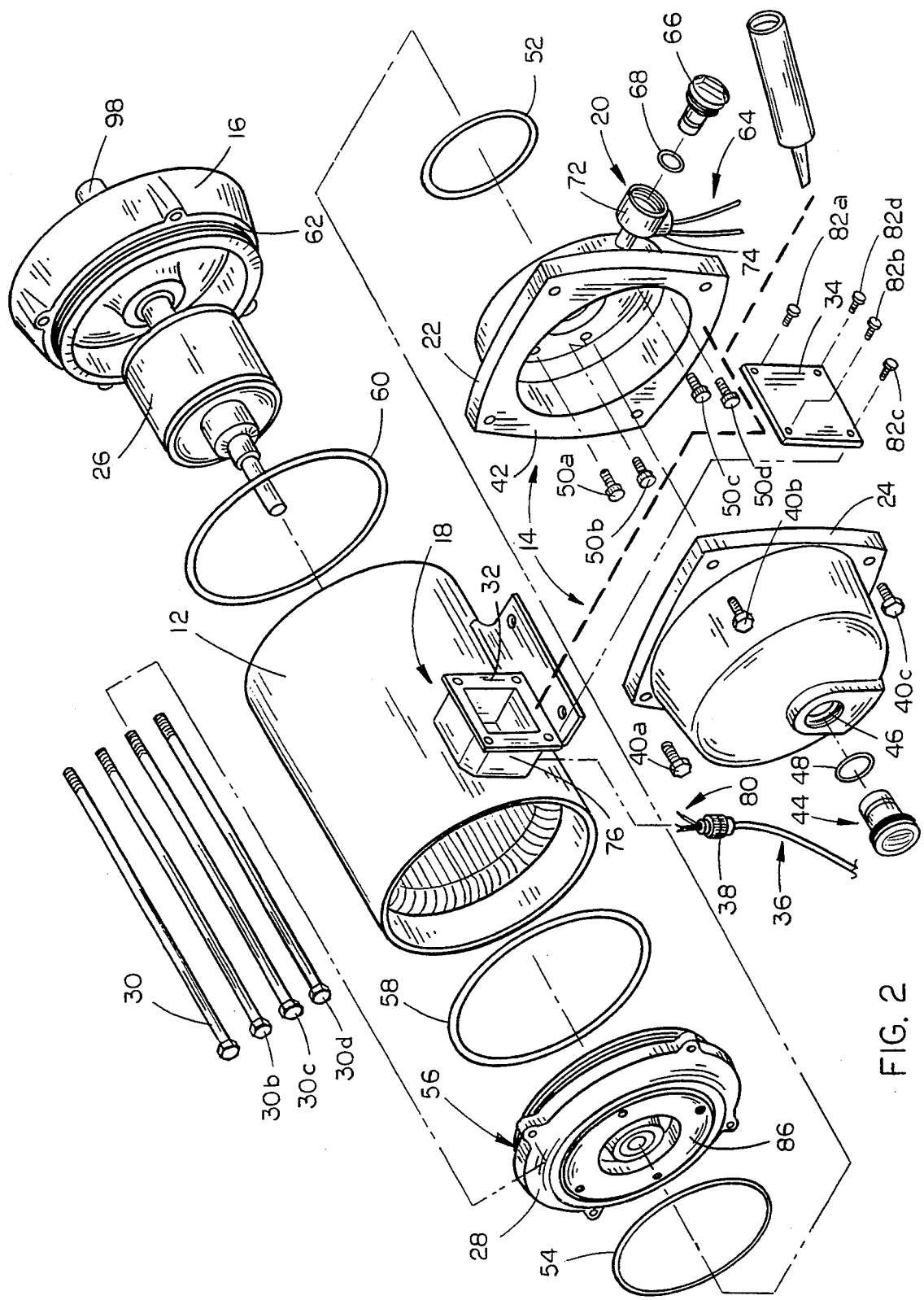
FIG. 2 is an exploded perspective view of the submersible explosion-proof electric brake motor apparatus showing the major components of the brake motor as well as the waterproofing elements.

The overall waterproofing apparatus and method are best illustrated in the exploded view of FIG. 2 which illustrates all of the waterproofing modifications made to the conventional explosion-proof brake motor. Brake housing 14 comprises first and second halves 22 and 24 respectively. First and second brake housing halves 22 and 24 are joined at brake housing mating surface 42 by means of brake housing connection bolts including bolts 40a-c shown in FIG. 2 and a fourth bolt, not shown, arranged similarly to bolt 40c but on the opposite side of the housing halves 22 and 24. In the preferred embodiment, a silicone caulk is evenly distributed throughout brake housing mating surface 42 such that when first and second brake housing halves 22 and 24 are mated, a substantially water proof seal is established there between.

In a preferred electric brake embodiment, brake housing 14 also comprises brake release knob 44 which is threadably received within opening 46 in brake housing second half 24. Rubber O-ring 48 is inserted between brake release knob 44 and opening 46 to achieve a substantially water tight seal therebetween.

Water proof sealing of electrical housing electrical conduit 20 is described in more detail below in conjunction with the description of FIG. 4.

Electric brake housing 14 is secured to brake motor housing cover 28 by means of bolts 50a-d. Two rubber O-rings 52 and 54 are placed between brake housing first half 22 and brake motor housing cover 28 in order to create a substantially water proof fit therebetween. Depending on the particular brake motor being adapted for submersion usage, it may be necessary to groove some of the O-ring mating surfaces prior to installation of the O-ring. In the preferred installation on the Baldor brake motor, mating surface 86 of cover 28 is grooved to accept O-rings 52 and 54.

Cover 28, brake motor housing 12, and flange 16 are secured together by means of bolts 30a-d. O-ring 58 is placed adjacent the inner mating surface 56 of cover 28 such that when cover 28 is mated to housing 12, O-ring 58 forms a substantially water proof seal therebetween.

As mentioned mating surface 62 of flange 16 is adapted to be secured to the opposite end of housing 12 also by means of bolts 30a-d. O-ring 60 is adapted to fit between mating surface 62 and housing 12 such that a substantially water proof seal is established therebetween. Water proofing of brake motor housing electrical conduit 18 will be more fully described below in conjunction with FIG. 5.

Figure 3:
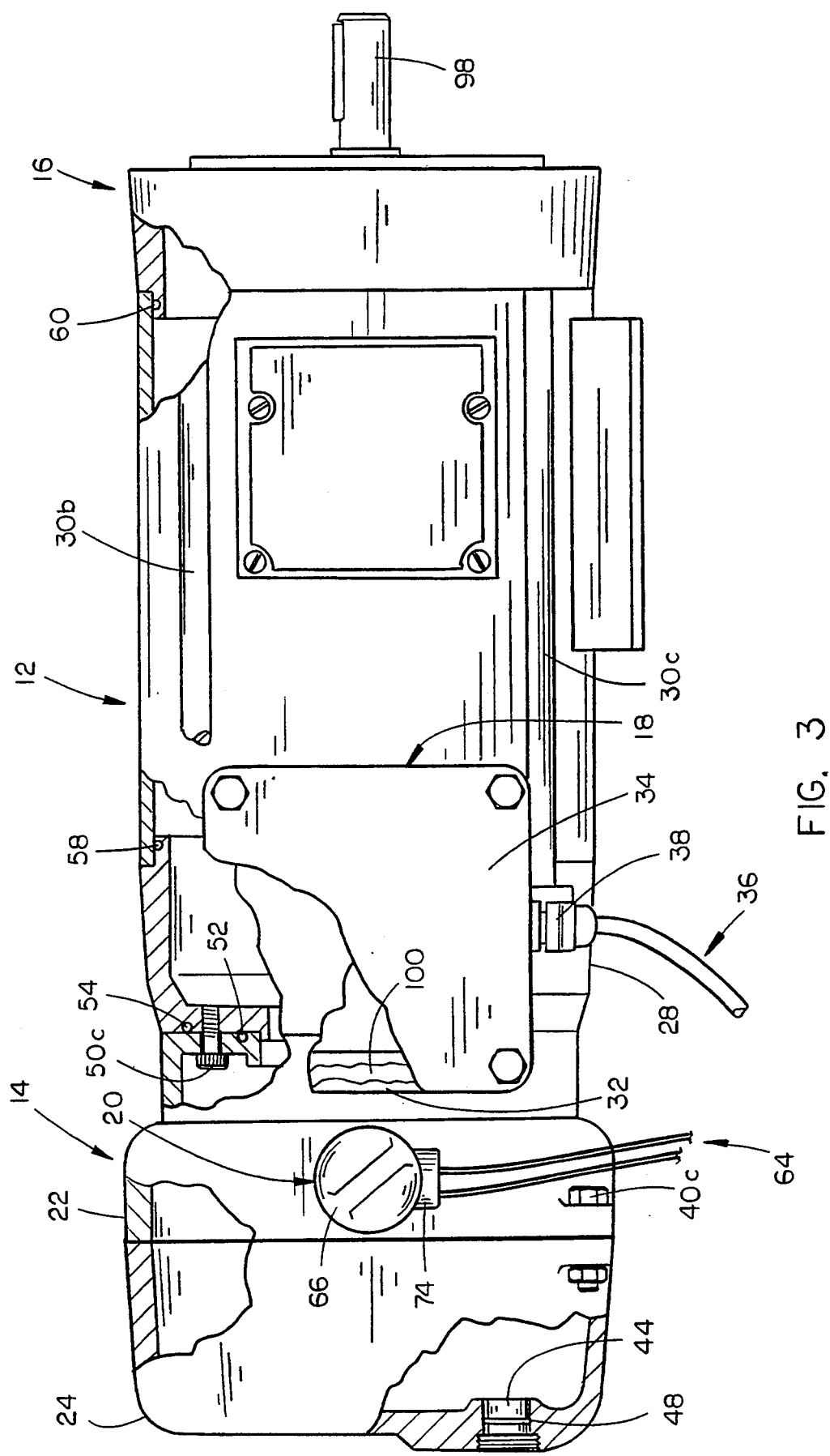
FIG. 3 is a cutaway side view of the assembled submersible explosion-proof electric brake motor apparatus wherein the waterproofing seals may be identified.

FIG. 3 is a side cutaway view showing in particular the location of various of the water proofing components described above in conjunction with FIG. 2. In particular, beginning from the left side of the figure, the water proofing installation of the brake release knob 44 is shown installed in the second brake housing half 24. As seen in the figure, the brake release knob 44 is threadably received within the body of the brake housing second half 24 and O-ring 48 is installed around the brake release knob and adjacent the brake housing second half 24 to establish a water proof seal between broke housing second half 24 and brake release knob 44. Brake housing second half 24 is shown mated to brake housing first half 22, wherein silicone caulk has been distributed around the mating surfaces as shown in FIG. 2.

Brake housing electrical conduit 20 is shown installed on brake housing 14 and in particular to brake housing first half 22. Details concerning the water proofing procedure and apparatus used for brake housing electrical conduit 20 is described below in conjunction with FIG. 4.

Brake housing 14 is attached to brake motor housing cover 28 by means of bolts 50a-c. The mating surfaces of brake housing first half 22 and brake motor housing cover 28 has been machined to accept two O-rings (52,54) of different diameters. As described above and as shown in FIG. 3, O-rings 52 and 54 are placed at the mating surfaces of brake housing first half 22 and brake motor housing cover 28 as shown in the figure, thereby creating a substantially water tight seal between the brake housing second half 24 and brake motor housing cover 28.

Cover 28, housing 12, and flange 16 are connected by means of bolts 30a-d. As shown in FIG. 3 and as described in more detail above, O-ring 58 is placed between cover 28 and housing 12 as shown in the figure in order to establish a substantially water tight seal between housing 12 and cover 28. Similarly, O-ring 60 is placed between mounting surface 62 of flange 16 and housing 12 in order to establish a substantially water tight seal between the flange 16 and housing 12. Also shown in FIG. 3 is the connection of the brake motor housing electrical conduit 18 to housing 12. As shown in the figure, a seal of silicone 100 is applied to the mounting face 32 of brake motor housing electrical conduit 18 so as to establish a substantially water tight seal between the mounting face 32 and mounting plate 34. Waterproofing of conduit be is described in more detail in conjunction with FIG. 5 below.

FIG. 4 is an enlarged view of the brake electrical conduit 20, its connection to electrical brake housing 14, and its water proofing. As shown in the figure, brake electrical conduit 20 is attached to brake housing first half 22. Brake electrical conduit 20 comprises cylinder 72 and plug 66. Cylinder 72 is adapted to threadably receive plug 66 therein. O-ring 68 has been placed between cylinder 72 and plug 16 such that when cylinder 72 threadably receives plug 66, a substantially water tight seal is achieved therebetween. Brake electrical wires 64 enter brake housing first half 22 through cylinder lower portion 74 and then into cylinder 71, and brake housing first half 22 through hole 88. In order to prevent water from entering brake housing first half 22, silicone 70 has been injected into hole 88 cylinder 72. Thus, a substantially water tight seal is provided for electric brake wires 64.

FIG. 5 is an enlarged diagram illustrating the water proofing of the brake motor electrical conduit 18. As seen in FIG. 5, brake motor housing electrical conduit 18 comprises a substantially rectangular housing 76 having a flat mounting surface 32. Electrical wires 80 are enclosed within cable 36 which is secured to rectangular housing 76 of conduit 18 by means of connector 38. Wires 80 then enter housing 12 through a hole 90 in the side of housing 12. Silicone caulk 100 is applied to the substantially flat mating surface 32 to which plate 34 is secured by means of bolts 82a-d. Caulk 100 thereby creates a substantially water tight seal between mounting surface 32 and plate 34. Interconnection of connector 38 with rectangular housing 76 effects a generally water proof seal therebetween. However, to provide additional protection and guard against any small leakage past either connector 38 or caulk 100, silicone 78 is injected into the hole 90 between rectangular housing 76 and brake motor housing 12. Therefore a means is provided for establishing electrical contact with the brake motor yet at the same time providing a substantially water proof interconnection means.

Figure 1:
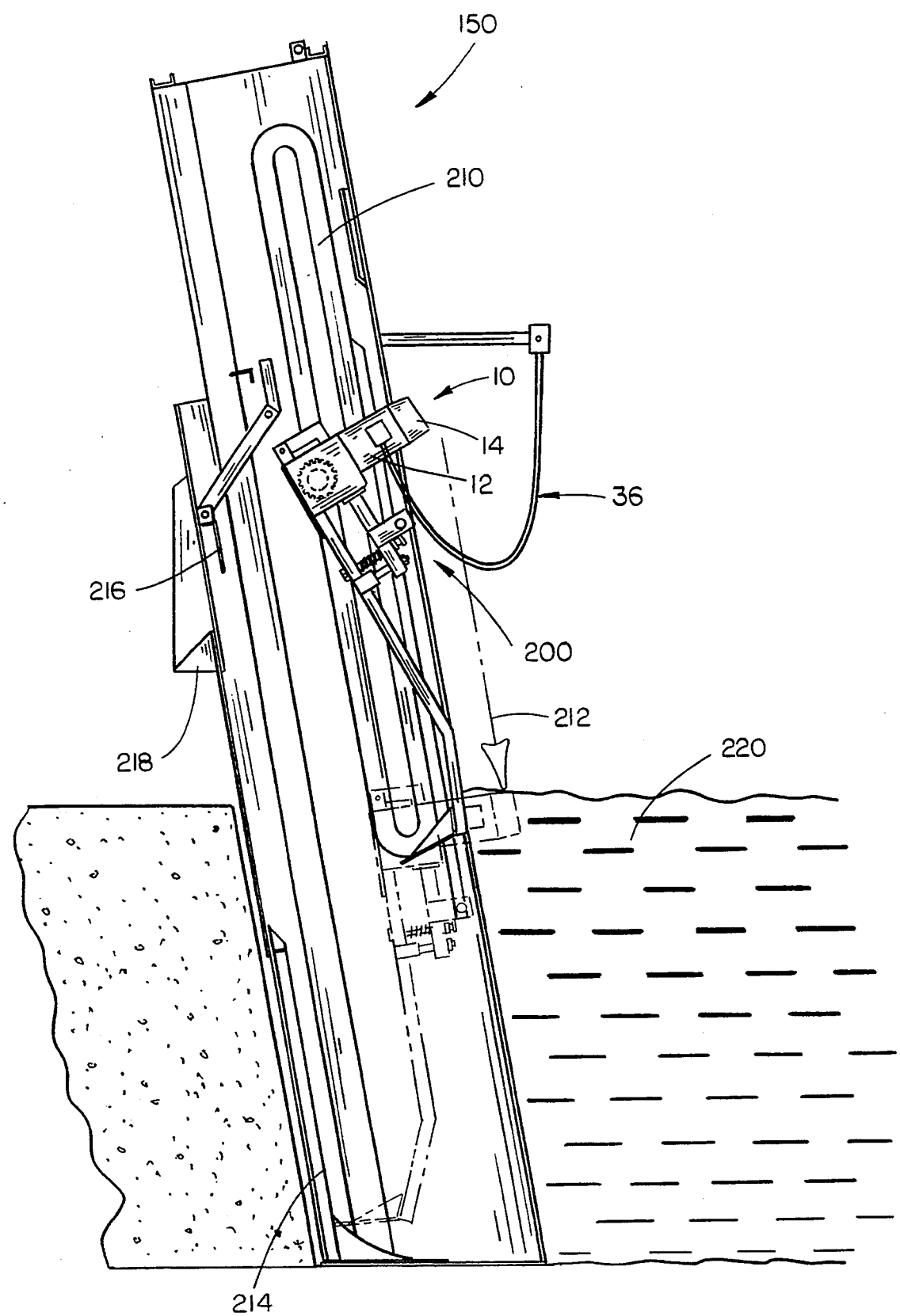
FIG. 1 is a side view of the electric brake motor apparatus installed in a typical operating environment.

FIG. 1 is an illustration showing the use of the submersible explosion-proof electric brake motor 10 of the present invention in a typical application. In this work application, the brake motor 10 is installed on a sewage treatment screen 150 such as the Mensch screen manufactured by Vulcan Industries of Missouri Valley Iowa. In this environment, the brake motor 10 is mounted on the rake 200. The brake motor 10 is operative to drive the rake 200 along the track 210. The brake motor 10 drives the rake 200 along the track in the direction of the arrow 212 until the rake 200 reaches the bottom of the track shown in the dotted position. Once the rake 200 has reached the bottom position, the brake motor 10 drives the rake upwards along the track 210. During its upward motion, the rake 200 scrapes any residual material residing on the face of the screen 214. Any residual material scraped from the screen 214 is then brought upwards with the rake along its upward movement on track 210 until it reaches wiper 216. Once rake 200 moves past wiper 216, any residual material is discharged into hopper 218. Rake 200 then continues around track 210 until it reaches the position shown in the figure. Depending upon the water level 220 in the sewer channel, the brake motor 10 may become submerged during the lower arc of its travel along track 210. Thus, it is desirable for brake motor 210 to be operable in a submersed environment. Since in this working environment the brake motor is submersed for a relatively small part of its overall working cycle, the waterproofing integral need not be as extensive as in other situations applicants have found that their modifications allow the brake motor to operate temporarily up to 25 PSI. Additionally, the modifications allow the brake motor to maintain proper operating temperatures. Additionally, it is common in sewage treatment environments to have methane or hydrogen sulfate gases. These gases may, in the right circumstances contain explosive potential. Thus, the applicants herein have designed a brake motor which may be operated in both explosive and submersed environments such as for sewage treatment operations.

It is obvious that numerous other modifications and variations of the present invention are possible in view of the above teaching. For example the material used to form waterproof connection may be composed of alternate materials such as sealing tape or the like. Yet another modification might be to include pressure indicating means on the brake motor to determine the operating environment.

Therefore, it is to be understood that the above description is intended in no way to limit the scope of protection of the claims and is representative of only one of several possible embodiments of the present invention.

There has thus been shown and described an invention which accomplishes at least all of the stated objectives.

I claim:
1. An improvement to a conventional explosion-proof electric brake motor having a motor housing, a motor electrical conduit attached thereto, a brake housing secured to the motor housing and having a brake electrical conduit attached to the brake housing, a flange secured to the motor housing and adapted to secure the brake motor to a drive mounting for driving a shaft, the improvement comprising:
   a first housing waterproof means between said motor housing and said brake housing to provide a waterproof seal therebetween,
   first conduit waterproofing means interposed between said brake electrical conduit and said brake housing to provide a waterproof seal therebetween,
   a second conduit waterproofing means interposed between said motor electrical conduit and said motor housing and to provide a waterproof seal therebetween,
   flange waterproofing means interposed between said flange and said motor housing to provide a waterproof seal therebetween, thereby to provide an explosion-proof electric brake motor which remains operative upon submersion into a body of fluid.
2. The submersible explosion-proof brake motor of claim 1 wherein said motor and brake housings each comprise 1a mating surface for joining said housings and wherein said first housing waterproofing means comprises first and second O-rings having differing diameters and wherein said first and second O-rings are secured to said mating surfaces.

3. The submersible explosion-proof brake motor of claim 1 wherein said brake electrical conduit has a cylindrical portion adjoined on one end to said brake housing, and said brake housing has a wire receiving hole registered with said cylindrical portion such that electrical wires may pass through said brake housing from said cylindrical portion and a cap secured to the opposite end said brake electrical conduit, said first conduit waterproofing means comprising silicon inserted into said cylindrical portion and said wire receiving hole and an O-ring sealing said cap to said cylindrical portion of said conduit.

4. The submersible explosion-proof brake motor of claim 1 further comprising a hole in said motor housing for receiving electrical wiring therethrough and wherein said motor electrical conduit is aligned with said hole in said motor housing and wherein said motor electrical conduit further comprises a cap adapted to be secured to said motor electrical conduit said cap and motor electrical conduit having respective mounting surfaces for securing said cap to said motor electrical conduit, said second conduit waterproofing means comprising both silicon inserted into said conduit and into said housing electrical wire receiving hole and silicon applied to said motor electrical conduit and cap mounting surfaces.

5. A submersible, explosion-proof electric brake motor adapted to be secured to a drive mounting for driving a drive shaft comprising:
   a motor housing;
   a motor electrical conduit secured to said motor housing;
   a brake housing secured to said motor housing;
   a brake electrical conduit attached to said brake housing;
   a flange secured to said motor housing and adapted to secure said brake motor to said drive mounting for driving said shaft,
   a first housing waterproof means between said motor housing and said brake housing to provide a waterproof seal therebetween,
   a first conduit waterproofing means interposed between said brake electrical conduit and said brake-housing to provide a waterproof seal therebetween,
   a second conduit waterproofing means interposed between said motor electrical conduit and said motor housing and to provide a waterproof seal therebetween,
   a flange waterproofing means interposed between said flange and said motor housing to provide a waterproof seal therebetween, thereby to provide said explosion-proof electric brake motor which remains operative upon submersion into a body of fluid.

* * * * *